(12) United States Patent
Gruber

(10) Patent No.: US 6,167,662 B1
(45) Date of Patent: Jan. 2, 2001

(54) METHOD FOR ASSEMBLING WINDOWS AND THE LIKE

(75) Inventor: Reinhold Gruber, Lauda-Königshofen (DE)

(73) Assignee: Roto Frank AG (DE)

(*) Notice: Under 35 U.S.C. 154(b), the term of this patent shall be extended for 0 days.

(21) Appl. No.: 09/298,492

(22) Filed: Apr. 23, 1999

(30) Foreign Application Priority Data

Apr. 29, 1998 (DE) .............................. 198 19 086

(51) Int. Cl.[7] ...................................... E06B 7/14

(52) U.S. Cl. .......................... 52/204.1; 52/204.5; 52/209; 52/204.7; 52/302.7

(58) Field of Search ............................ 52/204.1, 204.5, 52/209, 762, 745.19, 204.53, 204.7, 204.52, 302.7, 204.57

(56) References Cited

U.S. PATENT DOCUMENTS

| | | | | |
|---|---|---|---|---|
| 3,919,815 | * | 11/1975 | Alabaster | 52/97 |
| 4,608,796 | * | 9/1986 | Shea, Jr. | 52/204.595 |
| 5,555,684 | * | 9/1996 | Galowitz et al. | 52/204.5 |
| 5,603,585 | * | 2/1997 | Bruchu et al. | 403/382 |
| 5,836,119 | * | 11/1998 | Emmanuel | 52/204.71 |
| 5,890,331 | * | 4/1999 | Hope | 52/209 |

* cited by examiner

Primary Examiner—Christopher T. Kent
Assistant Examiner—Jennifer I. Thissell
(74) Attorney, Agent, or Firm—Pepe & Hazard LLP

(57) ABSTRACT

A method of assembling window or door frames includes the step of injecting, and partially setting, adhesive (14) in at least one intermediate space (13) between the glass (3) and the frame sections (1) whereby the gears and frame section are adhesively bonded. The frame section (1) has at least one intake channel (1) for adhesive (14) extending through it and connecting the intermediate space (13) for the adhesive (14) to the outside of the frame section, and the adhesive is injected therethrough.

16 Claims, 3 Drawing Sheets

METHOD FOR ASSEMBLING WINDOWS AND THE LIKE

BACKGROUND OF THE INVENTION

The invention concerns a method of assembling plastic window or door frames in which a frame section is adhered to the glass by means of an adhesive, and the frame sections and the edge of the glass are assembled within a groove for the glass. The frame sections form at least one intermediate space for the adhesive between the glass and the frame section or sections to be adhered, and the frame sections are attached as a frame at least partially surrounding the glass in the direction of its peripheral edge, before the connection between the frame sections sets. The invention also concerns a plastic frame section, especially for use in the above mentioned method with a groove for the glass to hold the edge of a pane of glass, where between the frame section and the pane of glass there is at least one intermediate space for adhesive to adhere the frame section to the pane of glass. Finally, the invention concerns a window or door frame, which is produced especially by the method described at the beginning, with a frame of sections at least partially surrounding a pane of glass on its edge in the peripheral direction; the frame sections have a groove for the glass into which the edge of the glass fits, and at least one of the sections is adhered to the glass, and there is at least one intermediate space with adhesive between the frame section in question and the glass.

A generic method is known from German Patent A-33 18 684 in which generic frame sections made of plastic that have been cut, mitred and provided with a groove for holding the glass are heated in the area where they are mitred and to be bonded until thoroughly plasticized, then set on a pane of insulating glass by means of a clamping device and assembled under pressure into a frame around the pane of insulating glass. After the weld connection between the frame sections has set, i.e., after the areas near the weld seams have cooled, the structural unit made up of the frame and the pane of insulating glass is taken out of the clamping device. In another step, a sealant is then applied in the intermediate space formed on both sides of the glass between the glass and the frame sections. The sealant is used, inter alia, to connect the frame sections and the frame formed by them and the pane of insulating glass into a bonded unit. Another previously known method of the type described at the beginning is altered in terms of the method discussed in German Patent Publication A-33 18 684 in that the sealant for adhering the frame sections to the glass of the window or door frame in question is applied in the groove for the glass on the frame sections in a step before the frame sections are put on the glass.

The goal of this invention, in terms of method, is to provide an optimized method, especially in terms of clock time, for assembling window or door frames. The problem of the invention, in terms of a device, is based on creating a frame section, especially for use in the method in the invention and especially on window or door frames produced by that method.

SUMMARY OF THE INVENTION

The method related problem is solved by the invention by a process of the type described at the beginning, in which, while the connection between the frame sections sets, adhesive is placed in at least one intermediate space between the glass and the frame section or sections to be adhered to it, and at least partially sets. In the sense of the invention, the connection between the frame parts and the frame of the glass is produced at the same time as the adhesive connection between the frame sections or frame and the glass. Performing the two known steps in parallel produces a relatively short clock time for assembly of the window or door frames in question. Compared to a variation of the method with the adhesive applied before assembly of the frame sections, the procedure in the invention is characterized, for one thing, by the fact that, at the time when the adhesive is applied, there is an intermediate space for it and consequently the exact amount of adhesive needed to produce an effective adhesive connection can be determined precisely. Excess adhesive pressed out of the intermediate spaces when the frame sections and the glass are put together is consequently avoided, as is too small an amount of adhesive insufficient to produce a permanent connection between the frame sections and the glass. For another thing, the method of the present invention prevents adhesive from being applied to the frame section in question, but then, for example, due to operational problems in the process, the latter cannot be applied before the adhesive bonds to the glass. As a result, adhesive bonded to the frame section can be removed from it again before the frame section can be reused.

The arrangement of the adhesion points is critical to the effectiveness and permanence of the adhesive connection between the frame section or sections and the glass, and, in the interests of the economy of the process, value is placed on achieving an effective, permanent adhesive connection with the smallest possible amount of adhesive.

In this sense, one advantageous embodiment of the method in the invention provides that at least one intermediate space for adhesive is made, which extends the area for mounting of the glass in the frame section in question and that adhesive is applied around this area in at least one intermediate space, and/or that at least one intermediate space extending in the longitudinal direction of the frame section in question is made to hold the adhesive, and adhesive is applied to several points offset from one another in the longitudinal direction of the frame section in the intermediate space or spaces, and/or that at least one intermediate space extending in the longitudinal direction of the frame section in question to hold the adhesive is formed on both sides of the glass in relation to the plane of the glass, and adhesive is applied to points offset from one another in the longitudinal direction of the frame section and alternately lying on one side of the glass or the other in the intermediate space or spaces, and/or that at least one intermediate space to hold the adhesive is made on both sides of the glass, and adhesive is applied to points arranged in the crosswise direction of the frame section in question running parallel to the plane of the glass and on both sides of the glass in the intermediate space or spaces. When adhesive is applied at several points, the clock time is relatively short if adhesive is applied to all or only some of the adhesive points while the connection between the frame sections is setting. For example, in the case of adhesive points offset from one another in the crosswise direction of a frame section running parallel to the plane of the glass, adhesive can be applied to the points underneath while the connection between the frame sections is setting, and application of adhesive to the points higher up follows production of the connection between the frame sections.

The invention offers several ways of applying the adhesive at the optimum point of adhesion. One variation of the method is preferred, in which at least one intermediate space for the adhesive is connected to the outside of the frame by at least one adhesive intake channel opening into the intermediate space and going through the frame, before adhesive is placed in the intermediate space in question through the intake channel or channels. In another preferred embodiment of the method in the invention, the adhesive intake channel or channels are bored for the sake of simplicity.

To prevent anything from affecting the appearance of the window or door frames, in the case of another variation of the method in the invention, the adhesive intake channel or channels is made to open into an outer surface of the frame at some distance from the visible surface or surfaces of the frame, if necessary, in its peripheral outer edge surface area.

The adhesive is put into the intermediate space or spaces for adhesive through the type of intake channels described, especially in a method designed according to the invention, which is characterized by the fact that at least one intermediate space for adhesive is sealed to the outside before it is applied, in any case, except for an adhesive intake hole. By sealing the intermediate space, the maximum volume of adhesive that can be held in it is clearly defined.

The device related problem mentioned above is solved by the invention by means of a frame section of the type described at the beginning, which has at least one adhesive intake channel that goes through it and connects the intermediate space for adhesive to the outside of the frame section. Adhesive can be applied through the intake channel or channels in the invention, especially while it is setting, but also basically after the connection is produced or set between the frame section in the intermediate space intended to hold it—especially when the intermediate space is closed or sealed except for one or more intake holes formed by one or more intake channels. Compared to the frame sections known from German Patent Publication A-33 18 684 mentioned at the beginning, the frame sections in the invention, because of at least one adhesive intake hole provided on them, are characterized by the fact that the adhesive can be put into the intermediate space intended for it in a very simple way. While in the state of the art, the seals, closed to the outside, for the intermediate space closed to the outside must be manipulated to create an access to the intermediate space, the person working with the frame sections in the invention in the form of the intake channel or channels already has the corresponding access.

To make it possible to put adhesive on those points which, based on their position, guarantee optimal effectiveness or strength for the adhesive connection between the frame section or sections in question and the glass of the window or door frame, the invention provides that at least one intermediate space for the adhesive extend in the area where a fitting is mounted on the frame section, and that at least one adhesive intake channel opens into the intermediate space for adhesive in the longitudinal direction of the frame section and that several intake channels for adhesive offset from one another in the longitudinal direction of the frame section open into the intermediate space or spaces, and/or that in relation to the plane of the glass at least one intermediate space for adhesive extends on both side of the glass, and that several intake channels for adhesive open into the intermediate space or spaces in the longitudinal direction of the frame section offset from one another alternately on one side of the glass or the other.

One preferred form of embodiment of the frame section in the invention is characterized by a clear definition of the maximum volume of adhesive, in the case of which at least one intermediate space for adhesive is bordered by the border of the retaining groove for the glass and by the glass, and at least one seal is provided on the frame section, which is on the glass and is sealed, and the intermediate space is closed to the opening of the retaining groove. Excess adhesive could be applied inadvertently on this type of frame section only through the adhesive intake channel or channels, but not therefore at points along the glass, for example.

In the interest of a giving the frame section an attractive look that is not affected by the adhesive intake channel or channels, the adhesive intake channel or channels open into an outer surface of the frame section that is away from the visible surface or surfaces of the frame section, if necessary on its peripheral outer edge surface.

One special, but not necessary window or door frame of the type described at the beginning produced by the method in the invention is characterized by the fact that between at least one intermediate space with adhesive and the outside of the frame, there is at least one adhesive intake channel running through the frame. The intake channel or channels can open into the intermediate space or spaces, as described in claims 11 and/or 12 and/or 13. The features specified in claims 14 and 15 can also be realized together or alternately on the window or door fin in the invention. At least one frame section of the type described above can be used on the window or door fins in the invention. No other manipulation of the seals closing the intermediate space or spaces for adhesive than in the case of the state of the art in German Patent Publication A-33 18 684 is required to apply adhesive to the window or door frames in the invention. The intake channel or channels can already be on the frame sections when they are delivered to the assembly site or set up only at the assembly site during assembly of the frame in question.

BRIEF DESCRIPTION OF THE DRAWINGS

The invention will be explained in greater detail below using schematic drawings as examples.

DETAILED DESCRIPTION OF THE PREFERRED EMBODIMENT

Figure 1:
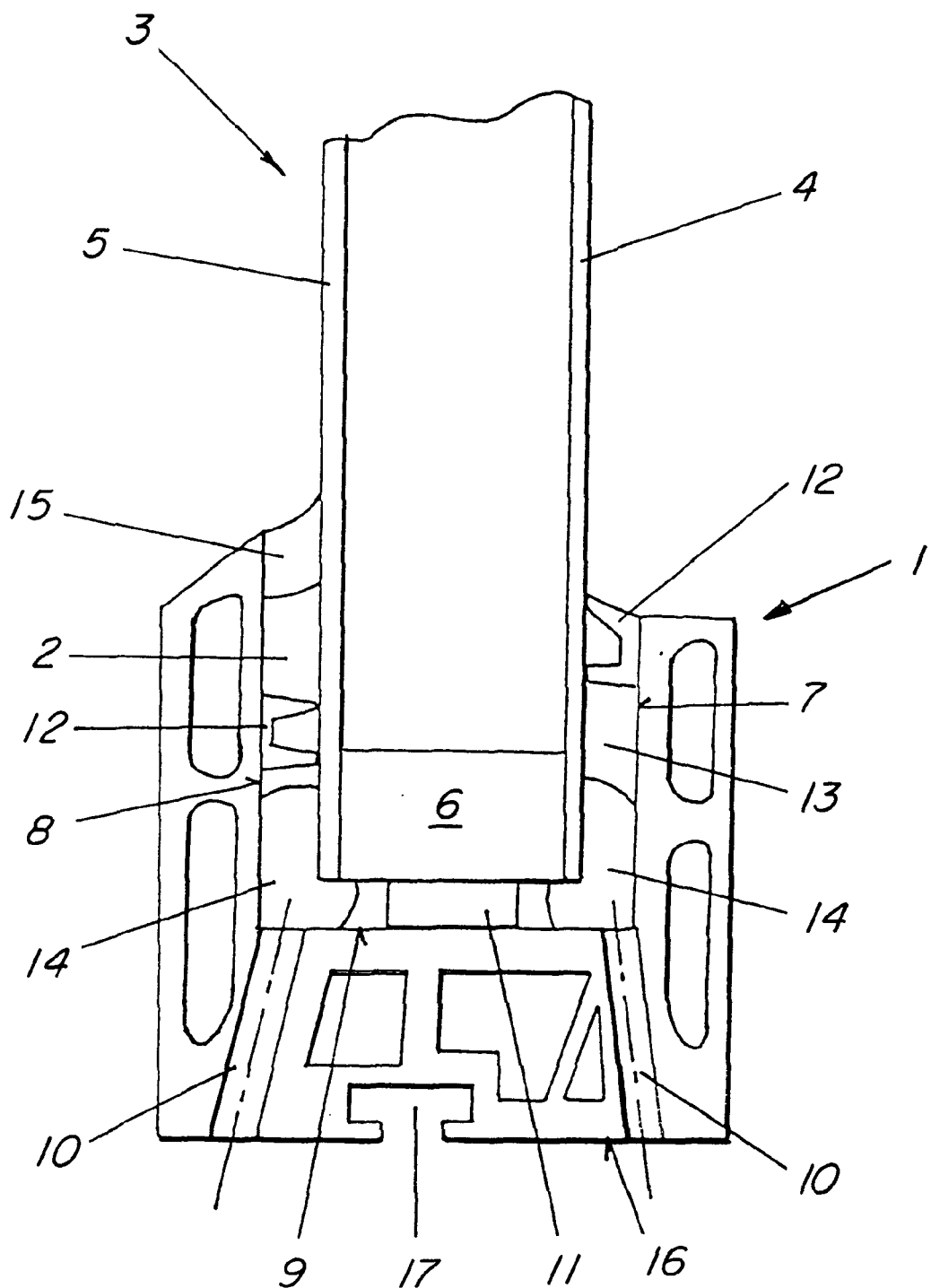
FIG. 1 is a fragmentary cross sectional view of a window frame in the area of a frame section embodying the present invention.

As shown, FIG. 1 is a frame section with a glass retaining groove 2, which holds the edge of a pane of glass 3. The glass 3 is a double glass with an inner pane 4 that faces the inside of the room and an outer pane 5 that faces the outside of the room. The inner pane 4 and the outer pane 5 are separated from one another in the conventional way by a spacer 6.

The glass retaining groove 2 is bordered by two parallel groove walls 7, 8 and a groove base 9 running perpendicular to them. Adhesive intake channels 10 in the groove base 9 lying in a transverse plane open out in the corner areas of the glass retaining groove 2. The glass 3 is supported on the groove base 9 by spacer blocks 11, one of which is visible in FIG. 1. Rubber seals 12 made as lip seals are adhered to the groove walls 7, 8 of the glass retaining groove 2 and extend like strips in their longitudinal direction. The seals 12 seal an intermediate space 13 formed between the glass 3 and the groove walls 7, 8 and the groove base 9 of the glass retaining groove 2 to the hole in the glass retaining groove 2. The intermediate space 13 is used to hold adhesive 14 in the form of silicone. A sealing bead 15, also made of silicone, is provided in the area of the hole in the glass retaining groove 2 between the outer pane 5 and the wall 8 of the glass retaining groove 2 opposite it. The peripheral surface of a fold 16 in the frame section 1 has an undercut fitting groove 17 for mounting hardware, by means of which the window frame shown is attached to an accompanying fixed frame on the side of the building.

The window frame shown fragmentarily in FIG. 1 is produced as described below by reference to FIGS. 2 and 3.

Figure 2:
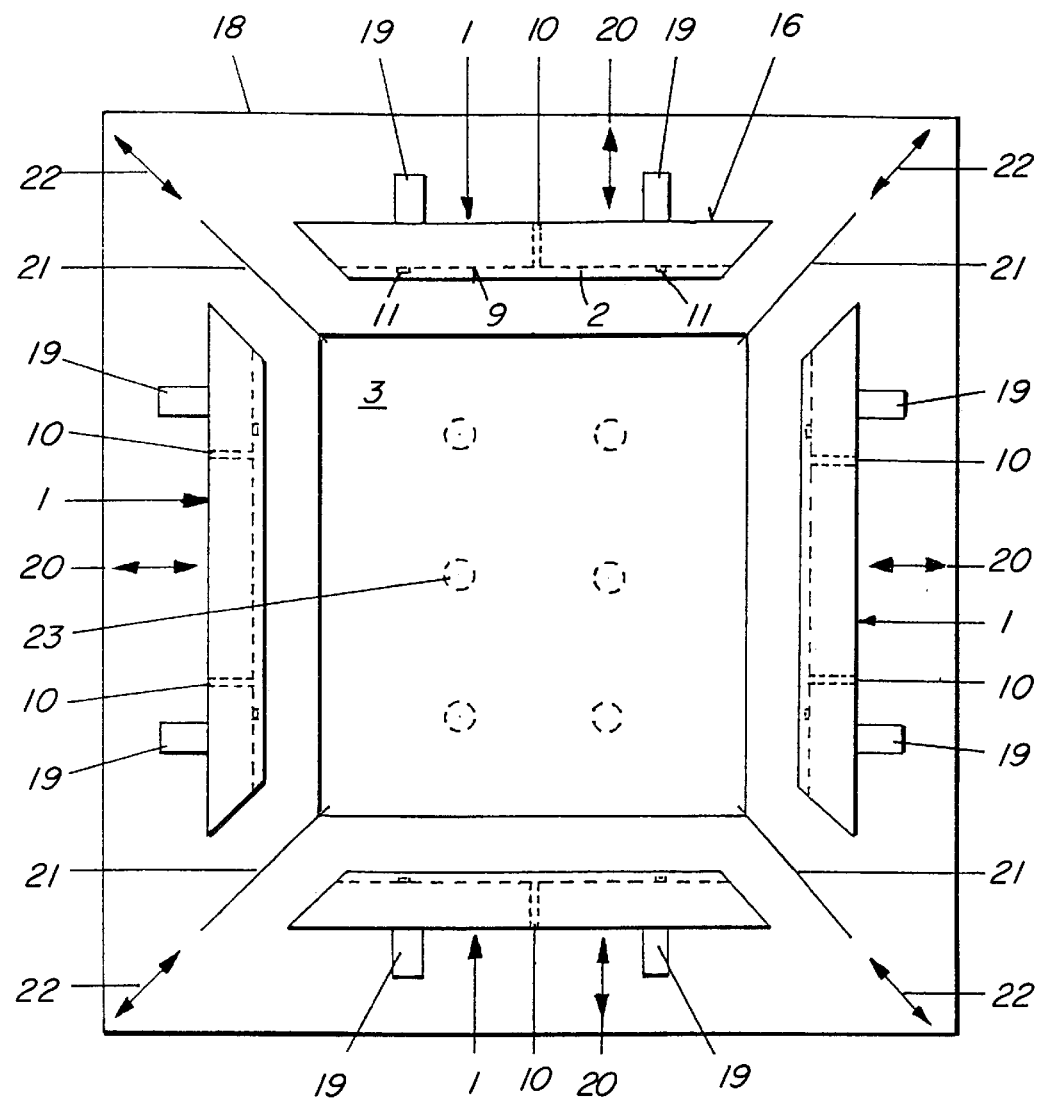
FIG. 2 is a diagrammatic illustration of the method for assembling the window frame in FIG. 1.

As shown in FIG. 2, a device for assembling window and door fins has a supporting table 18, which holds a total of four frame sections 1 and the glass 3. The frame sections 1 made of plastic are mitred on their ends. The adhesive intake channels 10 have been bored before the frame sections 1 are placed on the supporting table 18 starting from the peripheral outer edge surfaces 16 of the frame section 1. Tension clips 19 of a clamping device, known basically from German Patent Publication A-33 18 684, hold the frame section 1 and can move with it in the direction of the double arrows 20. Weld surfaces 21 are arranged according to FIG. 2 in the area between the ends of the frame sections 1 and can move in the direction of the double arrows 22. In the retaining groove 2 of frame section 1, two spacer blocks 11 are placed on the groove base 9. The glass 3 sits on supports 23, by which it is held at some distance from the supporting table 1.

To mount the glass 3, the mitred frame sections 1 with adhesive intake channels 10 are first moved together with the help of the tension clips 29, until their ends come to rest on the welding surfaces 21. The weld surfaces 21 then heat the ends of the frame section 1 until the entire abutting surfaces are plasticized. Then the frame sections 1 are moved apart a short distance by means of the tension clips 19 until they release the welding surface 21. The latter now move to the edge of the supporting table 18 and are then outside of the connecting area of the frame sections 1.

The frame sections 1 are then moved together by means of the tension clips 19, laid on one another under pressure with their plasticized ends abutting and, in this position in which they form a closed frame, held until the weld seam area cools and the weld connection between the frame sections 1 has thereby set.

When the frame sections 1 have been assembled into a closed frame as described, the edge of the glass 3 extends into the glass retaining groove 2 of the frame sections 1. The glass is then supported on the base 9 of the retaining groove 2 by the spacer blocks. The glass 3 is arranged crosswise to its plane at some distance from the groove walls 7, 8 of the retaining groove 2. An intermediate space 13 for the adhesive 14 between the glass 3 and the frame sections 1 is formed when they are put together. When the frame sections 1 are assembled, the intermediate space 13 is sealed by the seals 12 which protrude from the walls 7, 8 of the retaining groove 2 and abut the inner pane 4 and the outer pane 5 in the position of use.

While the assembled frame sections 1 are still held by means of the tension clips 19, i.e., while the weld seam areas on the frame sections 1 are still cooling and the softened connection area between the frame sections 1 is setting, adhesive 14 is forced through the intake channels 10 into the intermediate space 13 between the glass 3 and the frame sections 1. The adhesive 14 can be applied manually or automatically. The adhesive 14 applied in the intermediate space 13 bonds while the weld seams of the frame sections 1 are still cooling.

After the weld seams have cooled, the adhesive 14 is also at least partially hardened and an effective adhesive connection is produced between the glass 3 and the frame sections 1. Now the tension clips 19 can be moved back, releasing the frame sections 1 and the frame formed by them on the edge of the supporting table 18 and the assembled window frame can be taken off the supporting table 18.

The final finishing of the window frame requires only a small amount of work on the unit taken off the supporting table 1. For one thing, the weld beads formed by the welding in the area of the weld seams on the frame sections 1 must be removed. For another, the gap remaining between the outer panes 5 and the wall 8 of the retaining groove 2 opposite it is sealed by inserting silicone to form the sealing bead 15. The sealing bead 15 is also used as an adhesive and helps make an effective, durable adhesive connection between the glass 3 and the frame sections 1 or the frame assembled from them.

Alternatively to the method described above, the silicone can also be used for the surrounding sealing bead 15, so long as the frame sections 1 are pressed together by means of the tension clips 19 while their weld seams cool.

Figure 3:
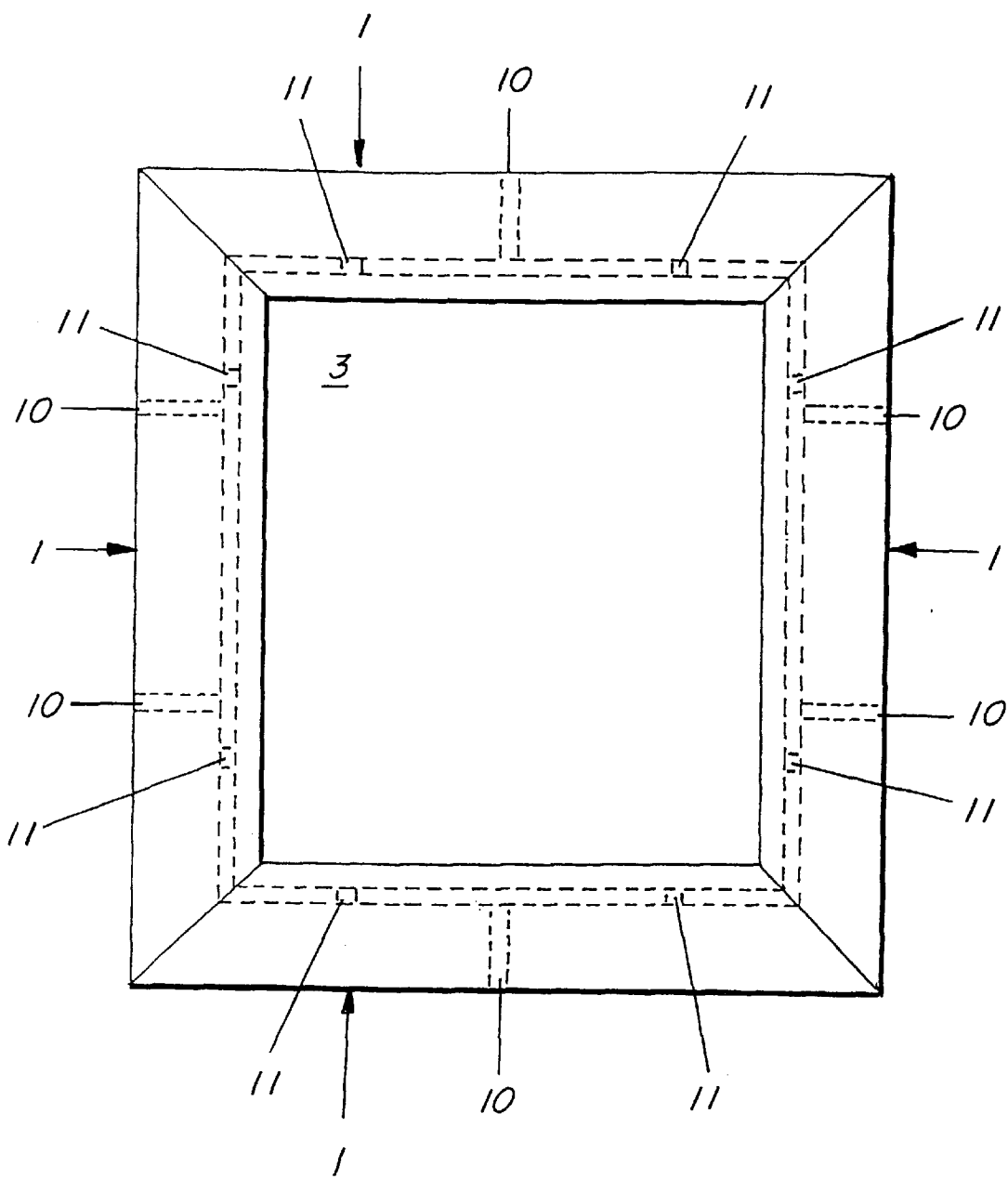
FIG. 3 is a plan view of the window frame of FIG. 1.

FIG. 3 shows the finished window frames. Details like the seals 12 or the fitting groove 17 are not shown in FIG. 3 for the sake of clarity.

Having thus described the invention, what is claimed is:

1. In a method of assembling window and door frames wherein at least one frame section (1) is adhered to a pane of glass (3) by means of an adhesive (14), and wherein frame sections (1) and the glass (3) are assembled with the edge of the glass in a retaining groove (2) in the frame sections (1), the steps comprising:
   (a) forming a frame section with at least one intermediate space (13) used to hold adhesive (14) between the glass (3) and said frame section (1);
   (b) assembling a plurality of said frame sections (1) into a frame at least partially surrounding said glass (3) in the direction of their peripheral edges; and
   (c) while a bond between said assembled frame sections (1) is setting, introducing, and at least partially setting, adhesive (14) in said intermediate space (13) between said glass (3) and said frame sections (1).

2. The method of assembling window and door frames in accordance with claim 1, wherein said step of forming at least one intermediate space (13) for holding adhesive (14) produces a space which extends into the area of the frame section where the glass is mounted in said frame section (1).

3. The method of assembling window and door frames in accordance with claim 1 wherein said forming step forms an intermediate space (13) for holding adhesive (14) which extends in the longitudinal direction of said frame section (1) and wherein said introduction step introduces adhesive (14) at several points in said intermediate space (13) which are offset from one another in the longitudinal direction of said frame section (1).

4. The method of assembling window and door frames in accordance with claim 1 wherein said forming step produces at least one intermediate space (13) for holding adhesive (14) extending in the longitudinal direction of said frame section (1) on both sides of said glass (3), and wherein said introduction step introduces adhesive (14) at points in said intermediate spaces (13) offset from one another and alternately on both sides of said glass (3).

5. The method of assembling window and door frames in accordance with claim 1 wherein said forming step produces at least one intermediate space (13) for holding adhesive

(14) on both sides of said glass (3) and wherein said introduction step introduces adhesive (14) at points in said intermediate spaces (13) offset from one another in the transverse direction of said frame section (1) running parallel to the plane of said glass and on both sides of said glass (3).

6. The method of assembling window and door frames in accordance with claim 1 including the step of forming at least one intake channel (10) from said intermediate space (13) for holding adhesive (14) to the outside of said frame, and wherein said introduction step introduces said adhesive (14) into said intermediate space (13) through said intake channel (10).

7. The method of assembling window and door frames in accordance with claim 6, wherein said step of forming said intake channel (10) comprises boring said intake channel from the outside of said frame to said intermediate space (13).

8. The method of assembling window and door frames in accordance with claim 6, wherein said step of forming said intake channel orients said channel to open at the outer edge surface of said frame.

9. The method of assembling window and door frames in accordance with claim 1 wherein said assembling step causes said frame sections about said glass to effect a closure of said intermediate space (13) from the outside of said frame except for an adhesive intake passage.

10. A frame section for assembly about a panel of glass having inner, outer and side surfaces with (a) a glass retaining groove (2) opening on its inner surface for holding the edge of a panel of glass (3);

(b) at least one intermediate space (13) communicating with said groove and spaced from said groove opening for holding adhesive (14) between the frame section (1) and the glass (3) to adhere the frame section (1) to the glass (3); and (c) at least one intake channel (10) on each side of said groove for adhesive (14) extending through said frame section (1) between said intermediate space (13)and one of the outer and side surfaces of said frame section.

11. The frame section for assembly about a panel of glass in accordance with claim 10, wherein said intermediate space (13) for holding adhesive (14) extends into the area in which the glass panel is to be mounted to the frame section (1) wherein said intake channel (10) for adhesive (14) opens in said area.

12. The frame section for assembly about a panel of glass in accordance with claims 10, wherein said intermediate space (13) for the adhesive (14) extends in the longitudinal direction of said frame section (1) and wherein several adhesive intake channels (10) for adhesive (14) are offset from one another in the longitudinal direction of said frame section (1) and open into said intermediate space.

13. The frame section for assembly about a panel of glass in accordance with claim 10, wherein said intermediate space (13) for holding adhesive (14) extends, in relation to the plane of the glass, on both sides of the glass retaining groove, and wherein several intake channels (10) for adhesive (14) are offset from one another in the longitudinal direction of said frame section (1) and open into said intermediate space alternately on opposite sides of the glass retaining groove.

14. The frame section for assembly about a panel of glass in accordance with claim 10, wherein said one intermediate space (13) for holding the adhesive (14) is bordered by the borders of said glass retaining groove (2) and will be closed by the glass panel(3) when inserted into said groove (12), and wherein at least one seal (12) is provided on said frame section (1), which, when the intermediate space (13) is closed to the glass retaining groove (2) by insertion of the glass panel (3), the seal 12 will bear upon the glass panel (3).

15. The frame section for assembly about a panel of glass in accordance with claim 10, wherein said intake channel (10) for adhesive (14) opens into an outer surface of said frame section (1) spaced from the side surfaces of the frame.

16. A window frame assembly for windows and doors comprising:

(a) a pane of glass;

(b) a frame comprised of a plurality of frame sections (1) at least partially surrounding said pane of glass (3) along its edge in the peripheral direction, said frame sections having inner, outer and side surfaces, said inner surface having a groove into which the edge of said glass pane (3) fits, at least one of said frame sections being adhered to said glass pane (3), said at least one frame section (1) providing an intermediate space (13) adjacent said glass pane; and (c) adhesive (14) in said intermediate space bonding said glass pane and said at least one frame section, said at least one frame section having at least one intake channel (10) for introducing said adhesive (14) which extends through said frame section from said intermediate space to one of said side and outer surfaces of the frame.

\* \* \* \* \*